Aug. 28, 1962 J. S. BROMAN Re. 25,233
TIGHTENING DEVICE FOR MANTLES AND LINERS IN CRUSHERS
Original Filed July 6, 1956
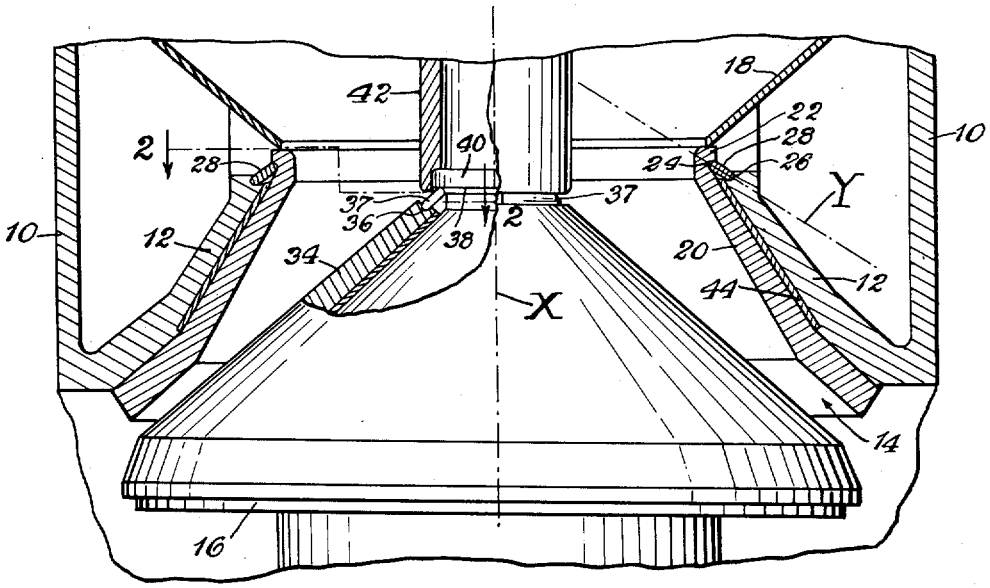
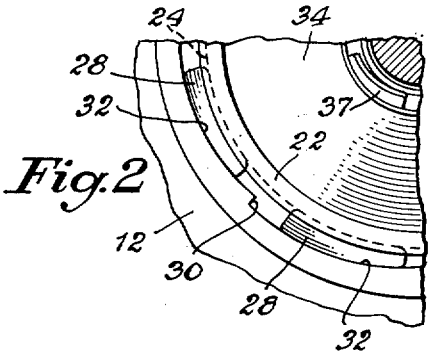
Fig. 2
Fig. 3
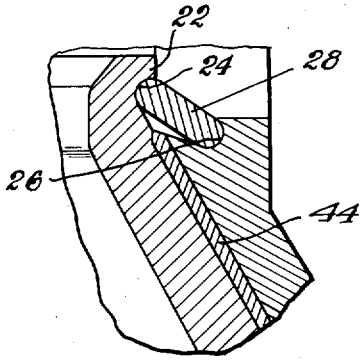
Inventor
John S. Broman
by Parker & Carter
Attorneys United States Patent Office Re. 25,233
Reissued Aug. 28, 1962

25,233

TIGHTENING DEVICE FOR MANTLES AND LINERS IN CRUSHERS

John S. Broman, Smedjebacken, Sweden, assignor, by mesne assignments, to Nordberg Manufacturing Company, Milwaukee, Wis., a corporation of Wisconsin Original No. 2,916,219, dated Dec. 8, 1959, Ser. No. 596,209, July 6, 1956. Application for reissue Dec. 4, 1961, Ser. No. 157,875

10 Claims. (Cl. 241—299)

Matter enclosed in heavy brackets [ ] appears in the original patent but forms no part of this reissue specification; matter printed in italics indicates the additions made by reissue.

This invention is in the field of crushers and may be considered an improved type of gyratory crusher.

A primary object of the invention is a mantle and liner with an improved interlock or locking mechanism for a gyratory crusher or the like.

Another object is a removable liner with a continuous outwardly opening interlocking groove or channel.

Another object is a removable and replaceable mantle or bowl liner for use with gyratory crushers or the like in which the mantle or liner is firmly held by a plurality of dihedral wedges.

Another object is a gyratory crusher with a self-tightening removable liner for the bowl.

Another object is a liner or mantle which can be easily and quickly replaced.

Other objects will appear from time to time in the ensuing specification and drawings in which:

FIGURE 1 is a vertical axial section;

FIGURE 2 is a partial section along line 2—2 of FIGURE 1 with the feed plate support removed; and FIGURE 3 is a partial section on an enlarged scale taken from FIGURE 1.

A main or outer bowl housing for a gyratory crusher or the like has been generally indicated at 10 in FIGURE 1 and it may be any suitable frame, base or support, not shown. Either separate or integral with the main housing is a bowl or concave 12 defining a central crushing cavity 14. A gyrating crushing head 16 may be supported in any conventional manner and gyrated by any suitable means to progressively nip and crush material fed into the cavity through the infeed trough at 18 which may take any suitable shape.

The bowl carries a liner 20 which conforms generally to the inner surface of the bowl, is truncated upwardly with a frusto-conical appearance in cross-section, and is turned outwardly at its upper edge to provide a continuous uninterrupted lip 22 defining an outwardly opening, somewhat circular or well-rounded locking groove or channel 24. At a convenient point, the upper surface of the bowl is provided with a corresponding groove 26 which is well-rounded or somewhat circular in cross-section and opens inwardly and slightly upwardly.

A plurality of wedge elements 28 are disposed between the bowl and liner on a dihedral to the liner and bowl axes. For example, the bowl and liner may be concentric with their axes shown generally at X while the plane Y of each wedge element is acutely arranged. Both the upper and lower longitudinal edges of the wedges are well-rounded to match the somewhat circular cross-section of the locking channels or grooves. The wedges are longitudinally arcuate or tapered and are arranged so that the liner will be self-tightening or self-locking in operation. The locking groove 26 on the bowl is formed into steps, as shown at 30 in FIGURE 2, to provide a series of arcs or cords 32. Each cord or segment is struck on a uniform arc eccentric to the bowl and liner axes and all groove segments may have the same eccentricity so that the wedges can be easily inserted before tightening.

The angle of each wedge element to the liner axis is important. The wedges cannot be disposed vertically, because the lip or overhang of the liner would extend outward beyond the bowl and the liner could be neither inserted nor removed. Neither can wedges be disposed laterally, because tightening would merely give an inward thrust or central squeeze on the liner but would not draw it against the bowl.

The crushing gyrating head may also carry a removable mantle 34 which has an upwardly and inwardly opening well-rounded groove 36 to interlock or coact with a suitable number of wedges 37 which bear against a well-rounded groove 38 on a suitable crown or the like 40 on the head. A feeding column or feed plate support 42 may be mounted on the head which will lock the wedges in place. In this case, the locking groove 36 on the mantle should be continuous while the groove 38 on the crown or head may be stepped or broken, similar to the outer grove 26 on the bowl.

The use, operation and function of the invention are as follows:

The liner and mantle may be of wear-resistant material such as manganese steel. It has been difficult in prior crushers to insert the mantles and liners so that they will be rigidly held in place during use but at the same time can be easily removed without damaging any of the parts which hold them in place. This is particularly true where the mantle and liner are designed for self-tightening.

The wedges in the invention can be tightened individually, because they are totally independent of each other. The tightening of one wedge will not cause any movement between the members. It is possible to tighten even a large and heavy mantle and liner by hammering successively the individual wedges. The wedges may be welded in place in any suitable manner after tightening and a zinc filling may be used, as at 44.

If zinc filling is used, it can be done without paying particular attention to the pouring level, and the zinc may spill over. When the mantle or liner has been inserted and tightened by the wedges, the zinc may overflow the wedges and the locking surfaces without damage. This is important, because it is difficult to control the level when pouring zinc, because of the smoke involved.

The dimensions of the wedges may be important. For example, they can have a thickness and length such that they will be deformed or upset when a certain pressure between the liner and the bowl has been attained. In a certain sense, the wedges may function as a safety release. When the mantle or liner is to be replaced, the wedges can be easily removed, either by hammer or by torch cutting, and the liner or mantle replaced. The wedges are easily manufactured and a variety of shapes may be involved.

It is important that the wedges be disposed at an angle to the bowl and liner axes. They have been shown on a dihedral so that a combined upward and inward thrust is provided. Self-tightening of the liner during operation provides an additional upward thrust to draw the liner firmly against the bowl. The diameter of the overhang on the liner lip or rim 22 is less than the passage through the bowl, so that the liner can be easily inserted from below.

It should also be understood that the stepped wedging surfaces 32 on the bowl could be a series of thread shaped surfaces. If the unit is made in small sizes, the wedges could be flexible so that normally they would not be longitudinally arcuate but could easily be flexed into an over-all arcuate and somewhat conical configuration when inserted between the opposed surfaces. The zinc filling is, of course, not necessary. Also, a pilot surface or pilot portion could be provided at the top of the liner next to the wedges so that the liner would be automatily centered accurately. If a pilot portion is used and c filling is desired, the guiding surfaces could be inter-ɔted by recesses so that the zinc could be easily poured. It will be realized that whereas a practical and opera-e device has been shown and described, nevertheless ny changes may be made in size, shape, number and position of parts without departing from the spirit and ɔpe of the invention. It is, therefore, desired that description and drawings be taken as in a broad sense istrative or diagrammatic rather than as limiting the ention to the specific showing.

I claim:

1. In a gyratory crusher or the like, a bowl and liner ncated upwardly, and a locking mechanism at their ɔer end including a plurality of independently movable uate wedge elements acutely disposed to the bowl and er axis between opposed continuous unbroken locking faces on the bowl and liner.

2. In a gyratory crusher or the like, an upwardly trun-ed axially aligned matching bowl and removable liner ing an interlock which includes a plurality of in-ɔendent arcuate, circumferentially movable, wedge ele-nts disposed on a dihedral to the bowl and liner axes ween opposed but spaced wedge surfaces on the bowl l liner, the liner wedge surface including an exterior wardly and downwardly opening continuous groove, bowl wedge surface including a series of interrupted connected interior inwardly and upwardly opening uate grooves, each being struck on a uniform arc entric to the bowl axis.

3. In a gyratory crusher or the like, a generally frusto-ical concentric bowl and removable matching liner, l an interlock between them so that the liner can be noved and replaced, including dihedrally opposed con-uous locking grooves at the top of the bowl and liner, l a plurality of longitudinally arcuate circumferentially vable tapered wedge elements confined dihedrally be-een the locking grooves, the grooves on the bowl be-interrupted and formed in arcuate segments, all of ich are struck on equal radii uniformly eccentric to the wl axis.

4. In a gyratory crusher or the like, an upwardly trun-ed, generally frusto-conical axially aligned, generally ncentric upright matching stationary outer bowl and novable inner liner with an interlock at their upper end ich includes a plurality of separate, rounded edged, gitudinally arcuate, circumferentially and independent-movable, wedge elements disposed and confined on a edral to the bowl and liner axes between opposed ced locking surfaces, well-rounded, in cross-section to tch the rounded edges on the wedge elements, on the wl and liner, the bowl locking surface including a series circumferentially stepped interior, inwardly and up-rdly opening, longitudinally arcuate grooves uniformly entric to the bowl axis, the liner locking surface in-ding an exterior outwardly and somewhat downwardly ening continuous peripheral groove concentric with the liner axis disposed within and above the bowl locking surface.

5. In a gyratory crusher or the like, a generally frusto-conical concentric bowl and removable matching liner, and an inerlock between them so that the liner may be removed and replaced, including dihedrally opposed continuous locking grooves at the top of the bowl and liner, and a plurality of longitudinally arcuate circumferentially movable tapered wedge elements confined dihedrally between the locking grooves, the groove on the bowl being interrupted and formed in arcuate segments.

6. The structure of claim 5 further characterized in that the series of stepped longitudinally arcuate grooves are struck on a uniform arc on equal radii concentric to the bowl axis.

7. In a crusher comprising a gyrating head, a wearing part for the crusher including a mantle on the head, means to tighten the mantle including a plurality of arc-formed wedges fitted to the mantle and head, the wedges being fitted [between] *into* a groove on the [bowl] *head* having guiding surfaces forming a continuous groove stepped into a plurality of stepped wedging surfaces.

8. The structure of claim 7 in which the wedges are longitudinally arcuate and tapered.

*9. In a gyratory crusher or the like, a generally frusto-conic concentric bowl structure and removable matching liner, and an interlock between them so that the liner may be removed and replaced, including a continuous groove on one of the bowl structure and liner, said groove having circumferentially stepped longitudinally arcuate wedging surfaces uniformly eccentric to the bowl axis, and a plurality of wedges lockingly fitted between the bowl structure and liner and received within said groove, said wedging surfaces being stepped in a direction so that the bowl structure and liner are self-tightening.*

*10. In a gyratory crusher or the like, an upwardly truncated generally frusto-conical axially aligned generally concentric upright matching stationary bowl structure and removable inner liner, an interlock therebetween so that the liner may be removed and replaced, including a groove on one of the bowl structure and liner, said groove being continuous and being divided into a plurality of stepped wedging surfaces, and a plurality of separate rounded edged circumferentially positioned wedge elements between the bowl structure and liner and positioned in said groove to lock the liner to the bowl structure, said wedging surfaces of being stepped in a direction so that the bowl structure and liner are self-tightening.*

References Cited in the file of this patent or the original patent

UNITED STATES PATENTS

| | | |
|---|---|---|
| 461,583 | Lowry | Oct. 20, 1891 |
| 1,176,835 | Kennedy | Mar. 28, 1916 |
| 2,341,543 | Gruender | Feb. 15, 1944 |
| 2,468,342 | Munro | Apr. 26, 1949 |
| 2,770,423 | Gruender | Nov. 13, 1956 |